UNITED STATES PATENT OFFICE.

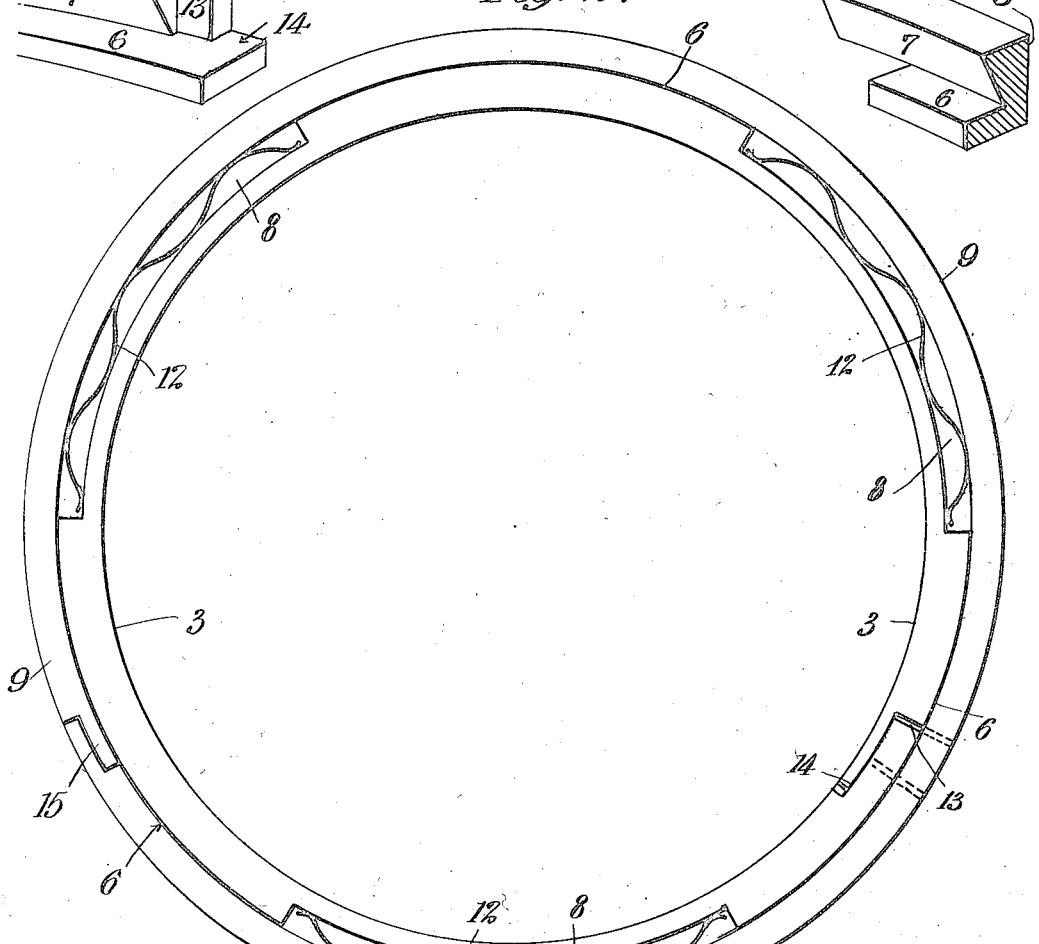

JOHN J. McGEE, OF NEW YORK, N. Y., ASSIGNOR OF ONE-HALF TO ANTHONY F. S. GEOGHEGAN, OF NEW YORK, N. Y.

PUMP PISTON-PACKING.

No. 875,095.　　　Specification of Letters Patent.　　　Patented Dec. 31, 1907.

Application filed September 16, 1907. Serial No. 392,974.

*To all whom it may concern:*

Be it known that I, JOHN J. McGEE, a citizen of the United States, residing at the city of New York, in the borough of Brooklyn and State of New York, have invented certain new and useful Improvements in Pump Piston-Packing, of which the following is a full, clear, and exact description.

My invention relates to a construction of piston ring or packing, particularly for use in pumps and similar apparatus for fluids and liquids, although the invention is of course not limited to this field of use, being applicable to steam cylinders and other relations.

Great attention has not been given to the piston packing of pumps for water or liquids, because the volume of liquid which escapes past a poorly fitting packing ring is greatly less than that of gaseous substances. Nevertheless it is important to have properly tight pistons in order to avoid considerable loss of power. It is also important to take up or compensate for the wear of the piston rings. The wear of a piston ring occurs at its periphery or circumferential surface where it contacts with the cylinder wall, and also at both of its flat end faces. The latter wear is due to the knocking back and forth of the ring in its groove by reason of any slight inaccuracy of fit therein. It is evident that in an ordinary packing ring, the amount of this wear grows greater and greater, since as the ring wears, it grows looser, and as it becomes looser, it knocks back and forth in its groove with greater force and impact. In carrying out the present invention, I correct this tendency and so construct and arrange the piston ring that it fits very tightly in its groove in a lateral direction at all times. This accuracy of lateral fit not only prevents wear for the reason above explained, but also prevents gases or fluid leaking down the side edges of the ring and underneath the same.

There is a still further and very important characteristic obtained by my present invention which may be briefly stated as follows: The outward pressure of the packing ring against the cylinder wall is produced by and equal to the force of its resiliency, but any tendency to contract the ring (produced for example by the incipient escape of fluid between the ring and the cylinder wall) is resisted not only by the resiliency of the packing ring, but by an additional binding force produced in a manner which will later be more fully explained. On account of this characteristic a defect of ordinary packing rings, namely of contracting to allow an escape of fluid in case a small leak is initially established by reason of the peripheral fluid pressure which is thereby applied to the ring, is thus wholly overcome by the present invention.

In the drawings, Figure 1 is a fragmentary sectional view of a piston having packing rings embodying the principles of my invention; Fig. 2 is a side view of one of the composite packing rings; and Figs. 3 and 3ª are detail perspective views showing the form of lap or joint employed for what I shall term the main packing ring.

Referring to the drawings in which like parts are designated by the same reference sign, 1 indicates the core or body of the piston, having circumferential grooves 2, in which packing rings may be received. The grooves 2 are of the ordinary rectangular section, and it will be noted that on this account the pistons of ordinary pumps and motors now in use are adapted to receive the present form of packing ring without any change or alteration whatever. I regard this as an important feature of my present invention.

3 designates the main packing ring which has a periphery or circumferential surface 4, adapted to engage the wall of the cylinder in which the piston moves. The ring 3 has one flat side wall or face 5, in a plane normal to the axis of the piston so as to fit closely against the adjacent face of the groove 2. The side of the packing ring 3 opposite to the face 5 has an annular recess of V-shaped transverse section. One wall 6 of this V-shaped recess is made a cylindrical surface co-axial with the peripheral surface 4. The other wall 7 of this V-recess is made a conical surface, converging in the direction of the opposite side of face 5 of the packing ring.

The continuity of the inner surface of wall 6 of the V-shaped recess above described is interrupted at intervals by depressions or cavities 8, of which in practice, I provide three or more spaced apart at equal angular distances around the piston ring. In Fig. 2, three of these depressions or cavities are illustrated and each of an angular extent of 60°, which leaves the intervening undepressed portions of the surface 6 also of 60° angular extent. 9 indicates what I shall term the supplemental packing ring, which has a peripheral surface 10, generally corresponding to the surface 4 of the main packing ring, and a flat end face 11, normal to the axis of the ring. The two remaining surfaces or faces of the supplemental packing ring 9 respectively correspond to and fit exactly against the surfaces 6 and 7 of the V-shaped recess in the main packing ring 3 already described. When the supplemental packing ring 9 is assembled with the main packing ring 3, a single composite ring of substantially rectangular section is produced, except that there remain the spaced cavities 8, open at one end or face of the completed or composite packing ring. In these cavities thus produced, I place the sinuous blade springs 12, which have an expansive resiliency in their cavities so that the supplemental ring 9 is impelled outward with respect to the main ring 3.

Each of the packing rings has a joint therein, and which may be made in any convenient or approved manner. I prefer to form the joint of the main packing ring 3 in the manner fully described and claimed in my companion application, Serial No. 391,419, and illustrated in Figs. 3 and 3ª of the present case. The essential characteristic of this joint is the provision of a surface 13, parallel to the face 5, and separated therefrom by a less distance than the thickness of the packing ring, together with a cylindrical surface 14, which is coaxial with the surface 4 and separated therefrom a less distance than the depth of the packing ring, and projecting beyond the end of the surface 13. The other end of the packing ring, shown in Fig. 3ª, is milled to fit the end shown in Fig. 3 in all respects. This joint is preferably made at a portion of the main packing ring not opposite or adjacent to a depression or cut-away section 8, so as to have the maximum amount of material available for the joints, etc. The joint in the supplemental ring 9 is indicated at 15, and may be of the ordinary "under and over" or any other sort, the accuracy of the fit in this ring being of less importance than that in the main packing ring 3.

In operation, the parts being assembled in the manner illustrated in Figs. 1 and 2, the main ring 3 is impelled outward to closely fit the bore of the cylinder by its own resiliency, in which relation it is normally gas or fluid-tight. The supplemental packing ring 9 is also impelled outward by its own resiliency and additionally by the resiliency of the springs 12. It is evident that the stiffness of the main packing ring is very much greater than that of the supplemental packing ring on account of its greater size and depth, so that the springs 12 do not cause any substantial loss in the outward spring pressure of the main ring. The supplemental ring 9 acting against the conical surface 7 is impelled laterally by the above described spring pressure applied to it, so that the complete or composite packing ring virtually expands laterally in its containing groove and binds tightly against both walls thereof. In this way the ring is made absolutely gas or fluid-tight on both of its wall engaging faces, also preventing wear in the manner already described. Also it will be observed that while the main packing ring 3 bears outward against the cylinder wall with substantially only the force of its own resiliency, that it exerts a much greater force to resist any tendency to contract it. For example, should the escape of gas or fluid have a tendency to contract the ring 3 against its resiliency, this contraction would necessitate either a sidewise or an inward movement of the supplemental packing ring 9. But this ring is engaged frictionally on one of its side faces and has its inward movement resisted by the springs 12 so that it merely binds tight between the wedging pressures applied to it and effectively resists the inward displacement of the main packing ring. This feature of my invention overcomes an important cause of leakage in ordinary packing rings.

What I claim, is:—

1. A packing for pistons comprising a main ring having a conical wall, and a supplemental ring fitting thereagainst, and springs intermediate the rings whereby said conical wall exerts a wedging action to spread the rings laterally.

2. A composite ring having a generally rectangular transverse section and composed of two separate parts each with a conical face fitting against the other, and intermediate springs to spread the parts laterally by the wedging action of the conical faces.

3. A packing for pistons comprising a main ring having a V-shaped recess with a conical wall, said recess having depressed portions, a supplemental ring fitting in said recess and bearing against said conical wall, and springs in said depressed portions of the recess and bearing against both rings whereby said conical wall exerts a wedging action to spread the rings laterally.

4. A composite ring having a rectangular transverse section and composed of two separate parts each with a conical face fitting against the other, one of said parts having depressed portions, and springs located in said depressed portions and operating to spread the respective parts laterally by the wedging action of the conical faces.

5. A packing for pistons comprising a main ring having a V-shaped recess with one conical wall and one cylindrical wall co-axial with the exterior surface of the ring, and a supplemental ring fitting in said recess and engaging both of said walls, said cylindrical wall having spaced depressed portions, and springs in said depressed portions and bearing against both rings whereby said conical wall exerts a wedging action to spread the wings laterally.

6. A packing for pistons comprising a main ring having a conical wall and having a single joint with a flat face parallel to an end face of the ring and having a cylindrical surface co-axial with the axis of the ring and extending beyond said flat face, and a supplemental ring fitting against said conical wall, and springs intermediate the rings whereby said conical wall exerts a wedging action to spread the rings laterally.

7. A packing for pistons comprising a main ring having a conical wall and having a single joint with a flat face parallel to an end face of the ring and having a cylindrical surface co-axial with the axis of the ring and extending beyond said flat face, and a supplemental ring fitting against said conical wall, said supplemental ring having an "under and over" lap, and springs intermediate the rings whereby said conical wall exerts a wedging action to spread the rings laterally.

8. A packing for pistons comprising a main ring having a conical wall, a supplemental ring fitting thereagainst, and sinuous blade springs disposed intermediate the rings, whereby said conical wall exerts a wedging action to spread the rings laterally.

9. A packing for pistons comprising a main ring having a recess with a conical wall and a cylindrical wall with depressed portions, a supplemental ring fitting in said recess and engaging said conical and said cylindrical walls, and sinuous blade springs in said depressions and bearing against both rings, whereby said conical walls exert a wedging action to spread the rings laterally.

In witness whereof, I subscribe my signature, in the presence of two witnesses.

JOHN J. McGEE.

Witnesses:
WALDO M. CHAPIN,
JAMES D'ANTONIO.